United States Patent [19]
Williams

[11] Patent Number: 5,492,198
[45] Date of Patent: Feb. 20, 1996

[54] ELEVATED TREE STANDS

[76] Inventor: Ralph D. Williams, 309 Hidden Hollow, Shreveport, La. 71115

[21] Appl. No.: 178,681

[22] Filed: Jan. 7, 1994

[51] Int. Cl.$^6$ .................................................. A45F 3/26
[52] U.S. Cl. .................................... 182/136; 182/187
[58] Field of Search ............................ 182/187, 188, 182/134–136, 116

[56] References Cited

U.S. PATENT DOCUMENTS

| | | | |
|---|---|---|---|
| 3,944,279 | 3/1976 | Blackstock | 182/187 |
| 4,427,092 | 1/1984 | Tentler | 182/134 |
| 4,953,662 | 9/1990 | Porter | 182/187 X |
| 4,995,475 | 2/1991 | Berkbuegler | 182/187 |
| 5,090,505 | 2/1992 | Amacker | 182/187 |
| 5,105,910 | 4/1992 | Engstrom | 182/187 |
| 5,234,077 | 8/1993 | Sheriff | 182/187 |
| 5,310,019 | 5/1994 | Paul | 182/187 |

*Primary Examiner*—Alvin C. Chin-Shue
*Attorney, Agent, or Firm*—Nixon & Vanderhye

[57] ABSTRACT

A tree stand includes a flat V-bar having an upstanding lip spaced from the tree when the V-bar engages the side of the tree opposite from the tree platform. A strap extends through the lip to secure the platform to the tree. A gun rest bracket enables a gun rest to pivot from an upright position to an inclined position, enabling the gun rest to serve as a support for the individual when climbing the tree. Tree teeth having multiple projections are applied to the platform to afford lateral stability to the platform. In a tree stand having a seat, a pair of clevises connect to a seat bracket for receiving a strap for securing the seat and stand to a tree. A ladder stand includes a plurality of disassembled ladder sections for forming a backpack and which sections, in assembly form a ladder. Quick connect-disconnect clips are secured to rails of one section and releasably couple to the rails of another ladder section to form a rattle-tree backpack of disassembled ladder sections. An anti-lock bushing is provided to prevent lock-up or binding of the sections when assembled to from the ladder.

3 Claims, 7 Drawing Sheets

ELEVATED TREE STANDS

BACKGROUND AND SUMMARY OF THE INVENTION

The present invention relates to elevated tree stands for use by hunters, naturalists or the like. The invention particularly relates to improvements in a combination climbing and hang-on tree stand, as well as in ladder stands wherein the individual uses the stand as a platform for standing or sitting at a desired elevation in a tree.

A typical tree stand is described and illustrated in my prior U.S. Pat. No. 4,802,552, the disclosure of which is incorporated herein by reference. In that tree stand, there is provided a platform which is useful by the individual for both climbing the tree, as well as affording a secure and stable platform at a desired elevation along the tree. The platform as illustrated in that patent also carries a collapsible seat whereby the individual, upon attaining the desired height in the tree, may secure the platform to the tree and extend the seat such that the individual may sit on the seat with his feet on the platform.

Another type of tree stand for similar purposes is known as a ladder stand. The ladder stand typically comprises a ladder comprised of two or more sections which sections can be secured one to the other to form a backpack thereby enabling an individual to trek into the desired area, for example, a wooded area for hunting. Upon reaching the site, the individual may assemble the ladder by connecting the ends of the sections to one another. The upper section typically includes a pair of angled support tubes which, when the ladder is in an upright position, includes a strap-and-hook assembly to hold the ladder to the tree. The upper section is also provided with a seat. The present invention relates to various novel improvements in both types of stands.

In one aspect of the present invention, there is provided a flat V-shaped bar for use with both the climbing and platform sections of a climbing tree stand. For example, the platform section has a pair of inclined supports attached at one end intermediate the ends of the platform and which supports are secured to the opposite ends of the V-shaped bar. Thus, the tree is completely encircled by one end of the platform which bears against the tree, the side supports and the V-shaped bar which bears against the opposite side of the tree from the platform. According to the present invention, the flat V-shaped bar has an upstanding flange or lip, preferably located along the outer edge of the bar adjacent the apex of the V-bar. The flange is slotted to receive a V-bar strap assembly for securing the section to the tree. The climber section similarly has a V-shaped bar secured to it in like fashion. Because the flange is spaced from the tree when the platform and climber sections are secured at the desired elevation, the platform cannot pivot away from the tree because the geometry of the securement causes the weight of the individual to force the platform against the tree. Additionally, the flange enables the V-bar to be made of lighter weight material, as compared with previous V-bars, and spaces the strap from the tree at its point of connection with the platform and climber sections, thereby avoiding abrasion of the strap at the connection with the V-bar.

In another aspect of the present invention, there is provided a gun rest mounting bracket on the climbing section enabling pivotal movement of a gun rest from an upright position serving as a gun rest for the hunter when on the stand and an inclined position serving as a safety support for the climber when the tree is being climbed. The gun rest is essentially a U-shaped bar having opposite, downwardly turned ends which are pivotally secured to the bracket. The gun rest bracket preferably comprises a flat bracket body secured along each of the opposite sides of the climber section and pivotally mounting the lower end of the gun rest. Each bracket body includes a pair of openings defining the connection points between the gun rest and the bracket in the upright and inclined positions of the gun rest, respectively. A spring-biassed pin carried by the gun rest is employed to lock the gun rest in one of the two positions.

In a further aspect of the present invention, the inner edge of the platform engaging the tree is provided with a pair of elastomeric tree teeth. The teeth are specifically configured to engage the tree without damaging it, while simultaneously affording lateral support for the stand, i.e., preventing rotation of the stand about the tree. Thus, the improved tree teeth provide a grip to the tree during climbing without destroying tree bark or otherwise damaging the tree, while simultaneously when the platform or climber section is secured at the appropriate elevation to the tree, afford lateral support for the climber or platform section at that elevation. Each of the tree teeth are specifically configured to have four vertically and horizontally spaced projections to afford such support.

In a still further aspect of the present invention, there is provided a tree stand having a seat elevated above a platform and readily and easily securable to the tree, regardless of the shape of the tree or the angle selected by the climber for the attaching mechanism. To accomplish this, a pair of clevises are secured to the bracket supporting and on opposite sides of the seat, the clevises extending toward the tree. One clevis is secured to an eye at one end of the strap, while the other clevis is secured to a hook on the opposite end of the strap. Intermediate the ends of the straps there is provided a buckle for tightening the strap about the tree and releasing the strap. In this manner, the clevises reduce excess wear on the attaching mechanism caused by line tension over uneven surfaces or the angle selected by the climber for attaching the stand to the tree.

In a still further aspect of the present invention, there is provided a ladder tree stand comprised of ladder sections which may be arranged in parallel relation to one another for backpacking into the woods and subsequent assembly to provide an elongated ladder stand for placement against a tree. In one embodiment thereof, the ladder sections are provided with quick connect-disconnect clips, whereby the ladder sections can be assembled together quickly for rattle-free carrying as a backpack when trekking, e.g., to a hunting site, and quickly disassembled so that the sections can be connected to one another to form an elongated ladder tree stand. Each clip comprise a split ring or enclosure for engaging about a side rail of a ladder section with flanges projecting from the enclosure ends to receive bolts whereby the clips can be permanently secured to a ladder section. The clip also has a projecting portion comprised of a pair of projecting legs for resilient securement to a side rail of another ladder section upon pressing it toward the clip. To release the sections, the sections are simply separated from one another, with the one section being withdrawn from the resilient clip.

In a further aspect of the present invention, the ladder sections are provided with anti-lock bushings. Upon assembly of the ladder, the upper ends of the side rails of each section are reduced in cross-section for telescopically receiving the lower ends of the side rails of another super-posed ladder section. Typically, the female and male portions of these telescoping connections will lock up and bind with one another when the individual climbs the ladder, rendering it extremely difficult and oftentimes impossible to disassemble the ladder into discrete sections for backpacking the ladder out of the woods. To prevent this, the present invention provides an anti-lock bushing having a central opening with a step or flange intermediate the ends of the opening defining a first bushing portion having a first cross-section corresponding to the cross-section of the side rails and a second bushing portion having a second cross-section corresponding to the cross-section of the reduced ends of the side rails. In this manner, each bushing may be received over the reduced cross-section end of the rails of the one ladder section, with the step or flange bearing against the transition radius between the rail and its reduced cross-section. When the female portion of the rail of the adjacent ladder section is received over the reduced male portion, the lower end of the female portion engages the upper edge of the bushing, preventing the upper rail from binding or locking up with the radiussed portion of the lower rail.

In a preferred embodiment according to the present invention, there is provided a tree stand having at least one of a climbing section and a platform section, one section including a frame comprised of a pair of laterally spaced elongated side frame members, a cross-member at one end of the frame for abutment against a tree, and a pair of inclined supports projecting from a location intermediate the ends of the frame toward the one frame end, a generally V-shaped flat, substantially planar bar having interior edges within the V-shape of the bar and exterior edges opposite thereto, the V-shaped flat bar engaging about a tree on a side thereof opposite the frame, means for connecting the V-shaped bar to the inclined supports to enable the one end of the frame, the inclined supports and the V-shaped bar to encompass the tree, a strap for connecting the V-shaped bar and the tree to one another, the V-shaped flat bar having a flange projecting out of the plane of the bar at a location spaced outwardly of the inner edges of the bar and having at least one slot for receiving the strap whereby the strap may extend through the slots and encircle the tree to secure the one section to the tree with the strap spaced from the tree at its connection with the flange.

In further preferred embodiment according to the present invention, there is provided a tree stand having a generally horizontally disposed frame for abutment at one end against a tree, including a pair of laterally spaced side frame members, inclined supports connecting to the fame at a location intermediate the ends of the frame and projecting toward the one frame end, crosspieces interconnecting the side frame members, and means connected to the frame for securing the tree stand to a tree, a gun rest carried by the frame and movable between an upright position and a position inclined relative to the platform, a gull rest bracket for releasably securing the gun rest in a selected one of the positions, including a bracket body secured to the frame and means cooperable between the gun rest and the bracket for releasably securing the gun rest in each of the positions.

In a still further preferred embodiment according to the present invention, there is provided a tree stand having a platform section comprised of a frame having a pair of laterally spaced, elongated side frame members interconnected by a plurality of crosspieces, tree teeth at one end of the frame for engaging the tree affording lateral support to the tree stand, the tree teeth including at least one elastomeric element having a tree-engaging side and a platform section-engaging side, and means for securing the elastomeric element to the platform, the tree-engaging side of each element including at least four projections spaced from one another both vertically and horizontally, with recessed portions therebetween, whereby the projections are engageable against the tree at vertically and horizontally spaced positions to substantially preclude lateral movement of the tree stand relative to the tree.

In a still further preferred embodiment according to the present invention, there is provided a ladder tree stand having a plurality of ladder sections for interconnection with one another to from a ladder, each section including a pair of laterally spaced elongated ladder rails interconnected by a plurality of ladder rungs, a plurality of clips for releasably attaching the ladder sections to one another in spaced, generally parallel relation to one another, each clip comprising a split enclosure for engaging about a rail of one ladder section and having a pair of flanges projecting from the split enclosure, means for securing the flanges to one another to secure the clip to the one ladder section rail with the latter rail within the split enclosure and a resilient clip portion projecting from the split enclosure for releasably engaging about a ladder rail of another ladder section located in generally parallel, spaced, and generally coextensive relation to the one ladder section, whereby the clips releasably connect the ladder sections in generally parallel relation to one another.

In a still further preferred embodiment according to the present invention, there is provided a ladder stand having a plurality of ladder sections interconnected with one another to form a ladder, each section including a pair of laterally spaced elongated ladder rails interconnected by a plurality of ladder rungs, each rail of one ladder section having at one end a reduced cross-section portion and a radius at a transition between the reduced cross-section portion and a remaining portion of the rail, each rail of another ladder section having at one end thereof a cross-section for telescopically receiving the reduced cross-section portion of a rail of the one ladder section, an anti-lock bushing formed of a plastic material having a central opening and received over the reduced diameter cross-section portion of each rail of the one ladder section with a portion of the bushing engaging the transition radius, each rail of another ladder section being engageable over a reduced cross-section portion of a rail of one ladder section and engageable with the bushing whereby the bushing prevents lock-up of the sections to one another.

In a still further embodiment according to the present invention, there is provided a tree stand comprising a platform section having a frame with a pair of laterally spaced elongated side frame members interconnected by a plurality of crosspieces, a seat, a bracket connected to the platform and the seat for supporting the seat above the platform, a strap engageable around a tree for securing the stand to the tree, a pair of clevises secured to the bracket, one end of the strap being received within one of the clevises, another end of the strap having a hook for releasable attachment to another of tire clevises, the clevises having a generally C-shape for securing one end of the strap and the hook along the C-shaped clevises, respectively, such that tire strap may extend from the clevises at different angles, precluding wear and binding of the strap when tire strap lies at various angles relative to the seat bracket, the clevises being pivotally mounted on the bracket.

DETAILED DESCRIPTION OF THE DRAWINGS

Figure 1:
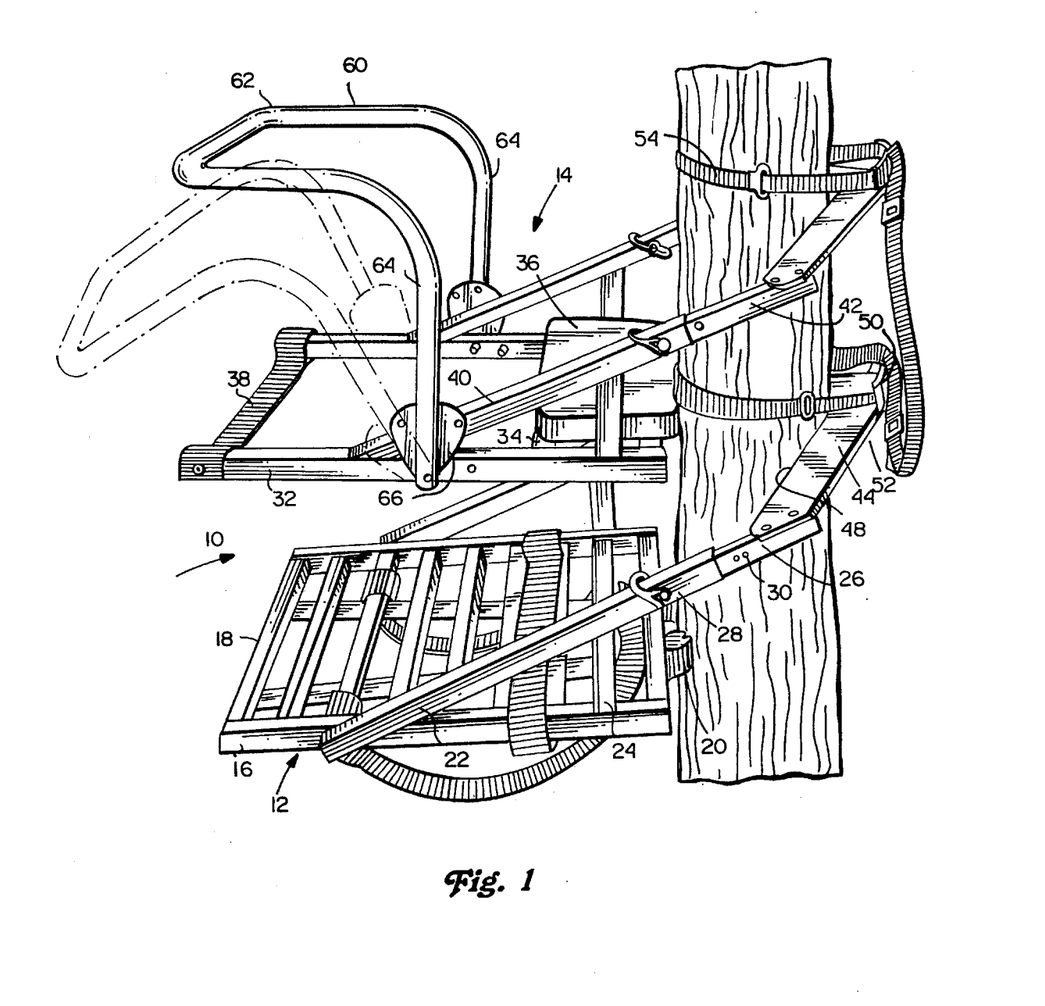
FIG. 1 is a perspective view of a climbing tree stand illustrating an improved V-bar and gun rest bracket according to the present invention.

Referring to FIG. 1, there is illustrated a climbing tree stand, generally designated 10, comprised of a platform section 12 and a climbing section 14. The platform section includes a generally rectangular frame having laterally spaced side frame members 16, longitudinally spaced cross-frame members 18 interconnecting side frame members 16, tree teeth 20 (described hereinafter) at one end of the platform for engaging the tree, inclined support members 22 disposed along opposite sides of the platform and connected at one end intermediate the ends of the platform, and braces 24 upstanding from the platform and connected to the support members 22. Members 22 have a reduced diameter telescoping member 26 whereby the extent of the combined members 24 and 26 can be adjusted by selectively engaging pins 28 into holes 30 of the reduced members 26.

Figure 2:
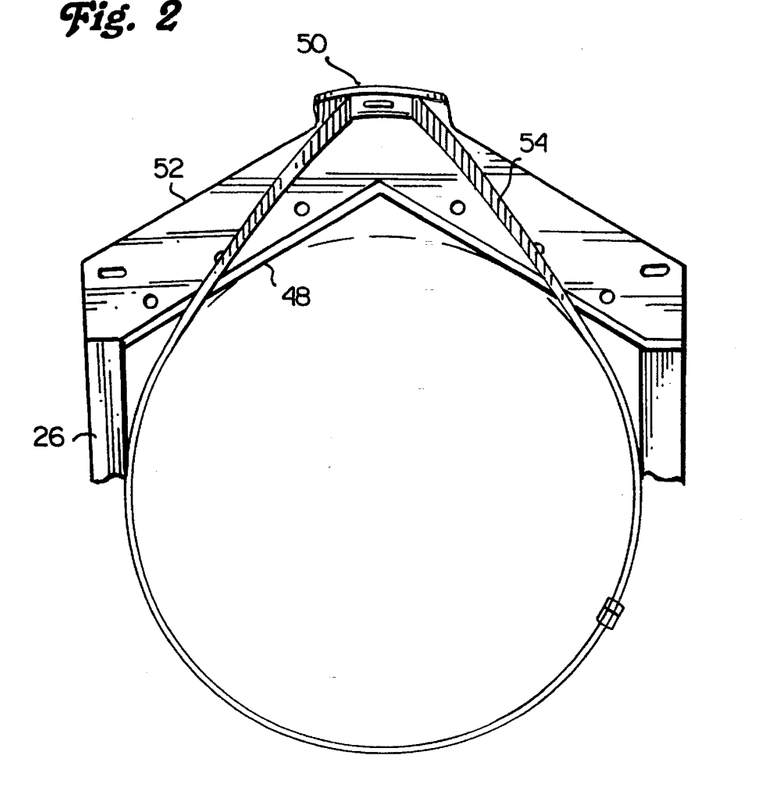
FIG. 2 is a fragmentary top plan view of the V-bar and illustrating a strap for securing the platform or climbing section about the tree.

The climbing section includes side frame members 32 interconnected by cross-members 34 adjacent the interior end of the section 14 for supporting a seat 36. The opposite end of the section 14 includes a web 38 used in connection with climbing the tree. Similarly as the platform section, inclined support members 40 are connected to the side frame members 32 and have telescoping members 42 such that the inclined members can be adjustable in length. Both the platform and climbing sections 12 and 14, respectively, are provided with a flat, generally V-shaped bar 44 connected to the telescoping members 26 or 42, as applicable. The distal ends of the V-shaped bar 44 are secured to the members 26 and 42 by bolts, two being illustrated at each end, although one bolt will suffice. It will be appreciated that each bar 44 has inner edges 48 for engaging the back side of the tree from the platform or climber section. Additionally, the bar 44 has an upstanding flange or lip 50 located along the outer edges 52 of the bar adjacent the apex thereof. The lip or flange 50 includes a pair of slots or openings for receiving a strap 54. From a review of FIGS. 1 and 2, it will be appreciated that strap 54, once secured about the tree, is spaced from the tree at the point of its connection with the upstanding lip or flange 50. The flanged V-bar thus properly positions the strap angle to prevent twisting of the strap and enable easy tightening and a secure hold. Additionally, by locating the flange adjacent the outer apex, the V-bar is reinforced at its point of greatest weakness, i.e., at its apex, enabling the V-bar to be formed of a lighter weight material, for example, ³⁄₁₆" stamped aluminum.

Figure 3:
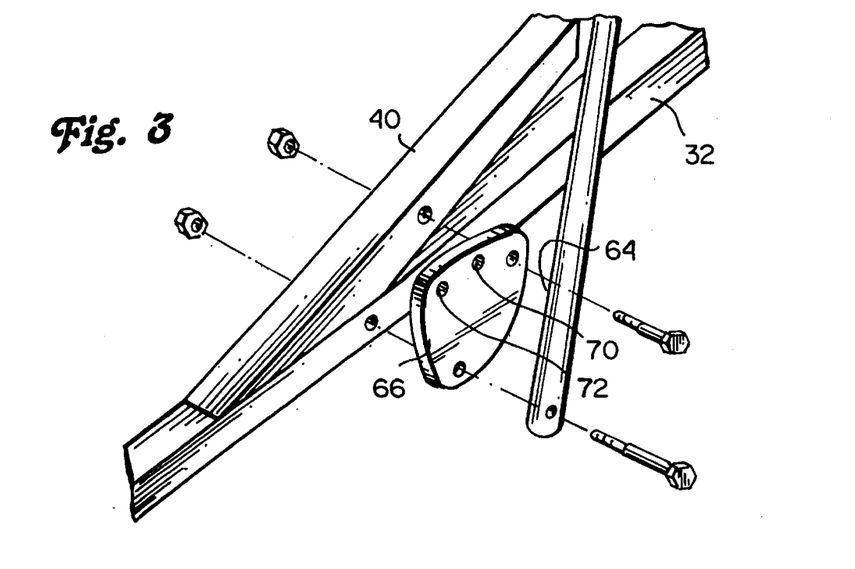
FIG. 3 is a fragmentary perspective view illustrating a gun rest bracket of the present invention.

Referring to FIGS. 1 and 3, it will be appreciated that the climbing section 14 is provided with a gun rest 60. Gun rest 60 comprises a generally U-shaped bar portion which, in the upright gun rest position illustrated in FIG. 1, extends generally horizontally and has a pair of depending legs 64 terminating at their lower ends in pivotal connections to a gun rest bracket 66 on opposite sides of the climbing section 14. As illustrated in FIG. 1, the gun rest 60 is pivotable between the upright full-line position and an inclined position illustrated by the dot-dashed lines. This inclined position serves as a safety support for the climber when climbing the tree. It will be appreciated that when climbing the tree, the climber's feet are strapped to the platform section and his torso extends between the side frame members 32, web 38 and cross-members 34 of the climbing section. When climbing, and with the individual facing the tree, the climbing section and platform section are alternately engaged and disengaged from the tree by pivoting the platform and climbing sections relative to the tree. For example, when the platform 12 and V-bar for the platform engage the tree and the platform 12 and the individual climber is supported thereby, the climber raises the climbing section to engage the frame and its V-bar against the tree. When supported from the climbing section, the climber pivots the platform to disengage the platform and its V-bar from the tree and then raises his knees to raise the platform to an elevated position. Subsequent engagement of the platform and V-bar against the tree enables the climber to support himself on the platform while the climbing section is disengaged and again elevated. It will be appreciated that during this climbing process, it is possible for the climber to tall backwards out of the climbing section. However, with the gun rest disposed in the inclined position, it provides a safety support for the climber, precluding him from falling backwards out of the climbing section.

Referring particularly to FIG. 3, the gun rest bracket includes a flat plate 66 which is secured by bolts to the side frame member 32 and the inclined support 40. As illustrated, there is provided a pair of openings 70 and 72 through the plate. A spring-biased pin is provided in the legs of the gun rest 64 for alternate engagement in either of openings 70 and 72. It will be appreciated that engagement of the spring-biased pin in opening 70 locks the gull rest in its upright, full-line position illustrated in FIG. 1, whereas engagement of the spring-biased pin in the opening 72 of the bracket 66 locks the gun rest 60 in the inclined position illustrated by the dashed lines in FIG. 1.

Figure 4:
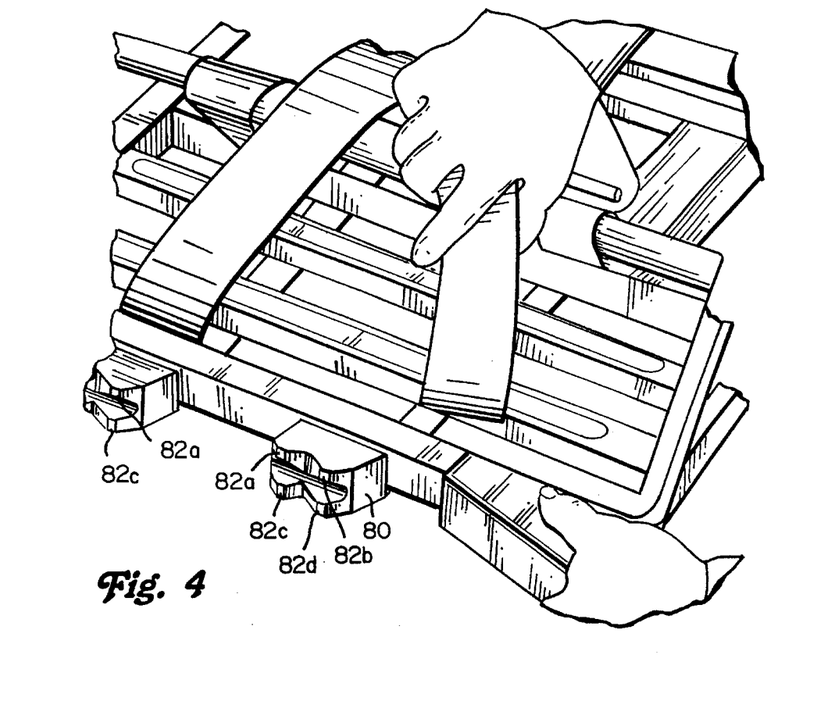
FIG. 4 is a fragmentary perspective view of the end of the platform which bears against the tree and illustrating improved tree teeth according to the present invention.
Figure 5A:
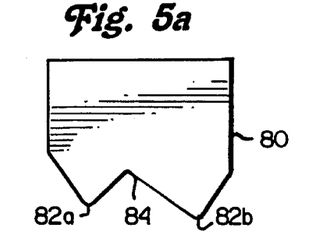
FIGS. 5a, 5b, 5c and 5d are top plan, side elevation, front elevation and rear elevational views, respectively, of the tree teeth illustrated in FIG. 4.
Figure 5B:
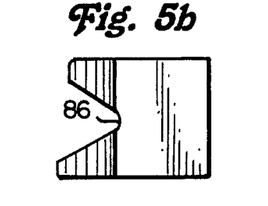
Figure 5C:
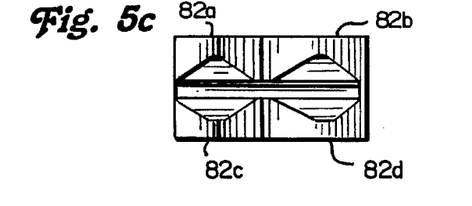
Figure 5D:
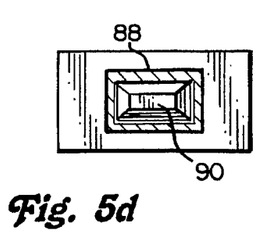

Referring now to FIGS. 4 and 5, there is illustrated a pair of tree teeth 80 secured to the forward edge of the platform section for engagement against the tree. The teeth are configured to provide lateral support, i.e., to prevent or minimize the movement of the platform laterally about the tree. Each tooth, as illustrated in FIGS. 5a–5d, includes tour projections 82a, 82b, 82c and 82d. The projections 82a and 82c are separated laterally from the projections 82b and 82d by a V-groove 84 extending vertically along the tree-engaging surface of each tooth 80. The projections 82a and 82b are separated vertically from the projections 82c and 82d by a V-groove 86 (FIG. 5b) extending generally horizontally along the tree-engaging surface of each tooth 80. Thus, four projections lie in engagement with the tree to grip the tree during climbing without destroying bark and provide lateral support for the stand when attached to the tree, i.e., they enable a stable platform.

To secure the tree teeth to the platform, the platform has a pair of hollow projecting stubs 88 rectangular in cross-section, the stubs extending forwardly from the forwardmost cross-frame member 24. The rear face of each tooth has a generally rectilinear slot corresponding in cross-section to the stub 88 and all interior projection 90 forming a male portion for reception within the hollow interior of the projecting stub 88. An adhesive may be used to further secure the projections to the platform.

Figure 6:
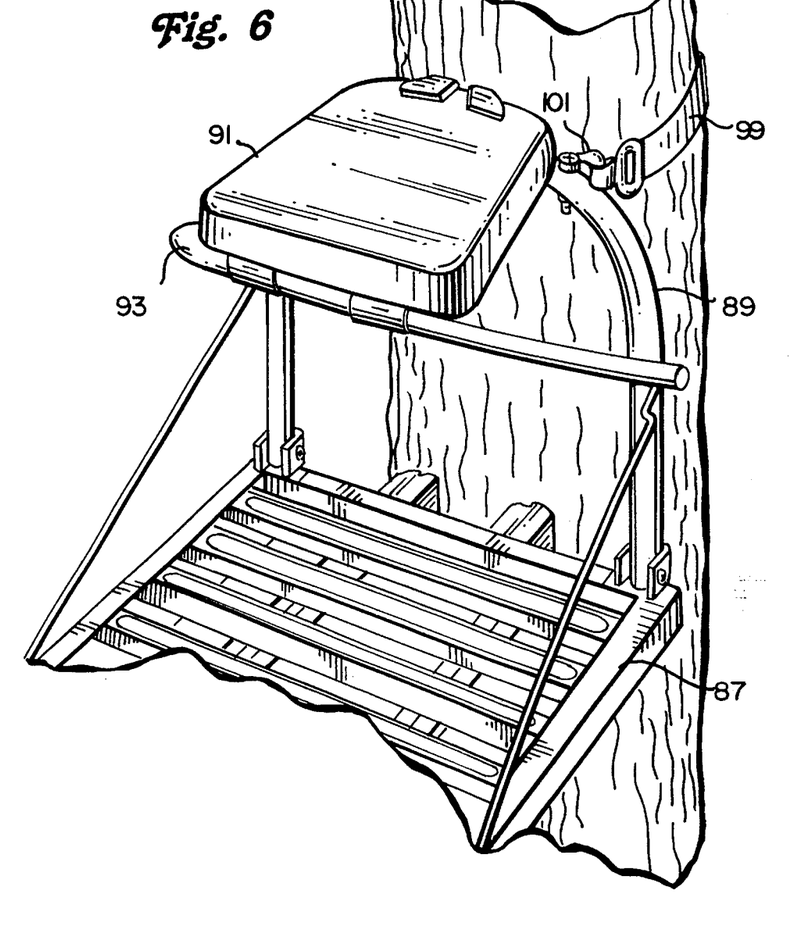
FIG. 6 is a view similar to FIG. 1 illustrating a different form of tree stand with a clevis/strap connection for securing the stand to the tree.
Figure 7:
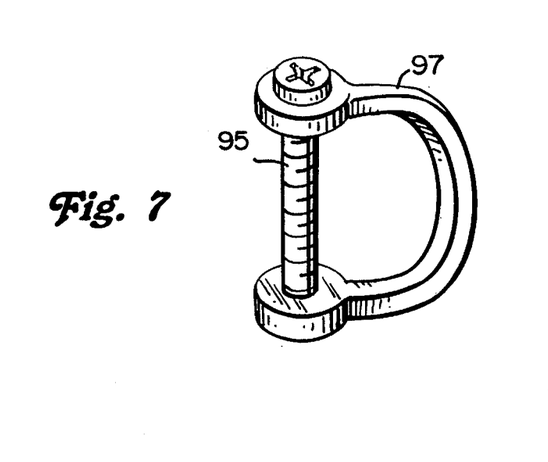
FIG. 7 is a perspective view of the clevis illustrated in FIG. 6.

Referring now to FIGS. 6 and 7, there is illustrated a tree stand having a platform 87, and a generally inverted U-shaped bracket 89 pivotally secured to the platform 87, and upstanding therefrom as illustrated in FIG. 6 to support a seat 91. A pivoted bracket 93 extends from bracket 89 to support the forward edge of the seat, as illustrated. To secure the stand to a tree, the bracket 89 is provided with openings to receive the bolt portion 95 of a clevis 97. Two clevises are employed on respective opposite sides of the seat 91. A reverse loop of a strap sewn back onto itself, not shown, is passed through the clevis 97 on one side of the seat and forms one end of a strap 99 for securing the stand to the tree. The opposite end of the strap 99 includes a hook 101 for engaging the other clevis 97. Behind the tree and not shown in FIG. 6, is a buckle whereby the length of the strap 99 can be adjusted and hence tensioned about the tree to secure the seat bracket 89 against the tree or releasable to permit disconnection of the hook 101 from the clevis. It will be appreciated that the clevises permit the strap to lie in tension at all times irrespective of the angle of the strap relative to the clevis. Additionally, the clevis pivots about its bolts such that different diameters of trees can be accommodated, with the strap always in tension. These features reduce excess wear on the attaching mechanism caused by line tension over uneven surfaces.

Figure 8:
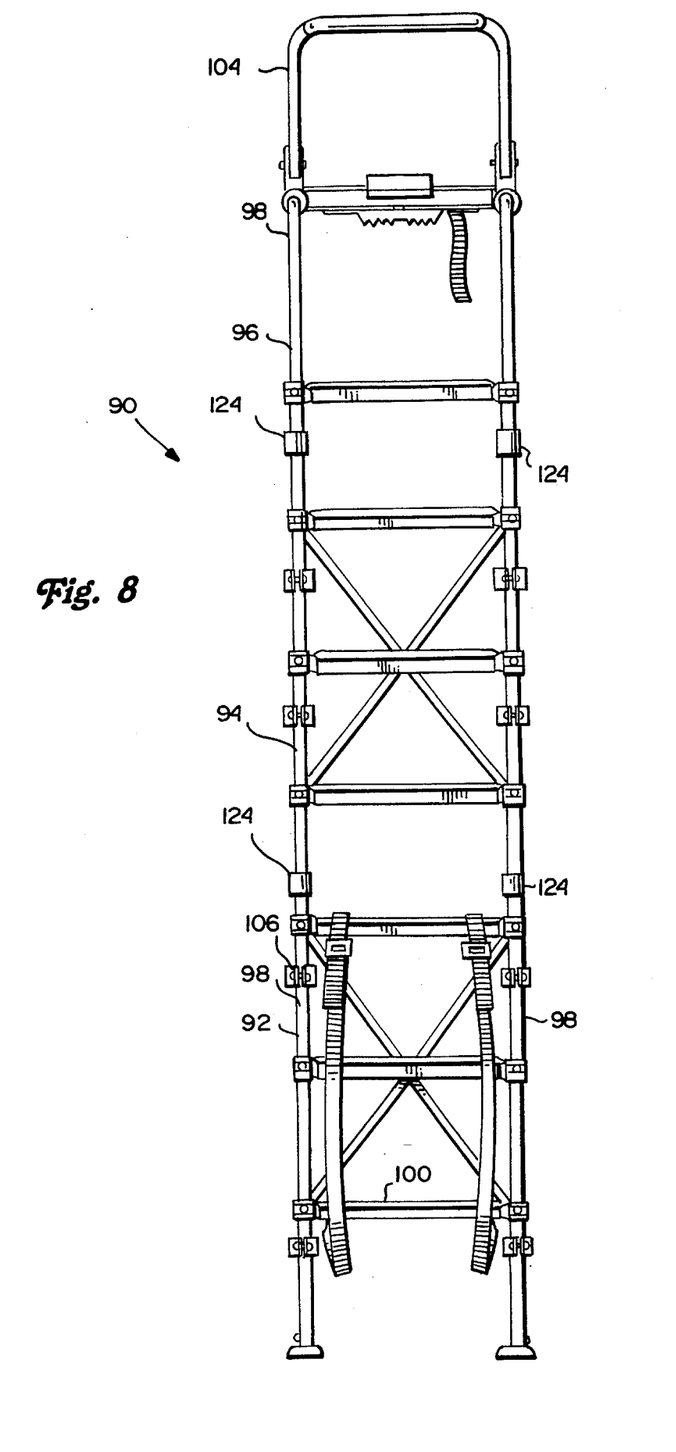
FIG. 8 is an elevational view of a ladder stand with various improvements according to the present invention.

Referring now to FIG. 8, there is illustrated a ladder stand, generally designated 90. Stand 90 is provided in a plurality of ladder sections, in this case, three sections 92, 94 and 96 being illustrated, although it will be appreciated that a greater or lesser number of sections may be provided. Each section includes a pair of tubular side rails 98 with steps 100 extending between the side rails. The side rails 98 of the upper section 96 have upper portions 102 projecting generally at right angles to the rails 98 (FIG. 9), the rails 102 pivotally mounting a gun rest 104, described hereinafter.

Figure 9:
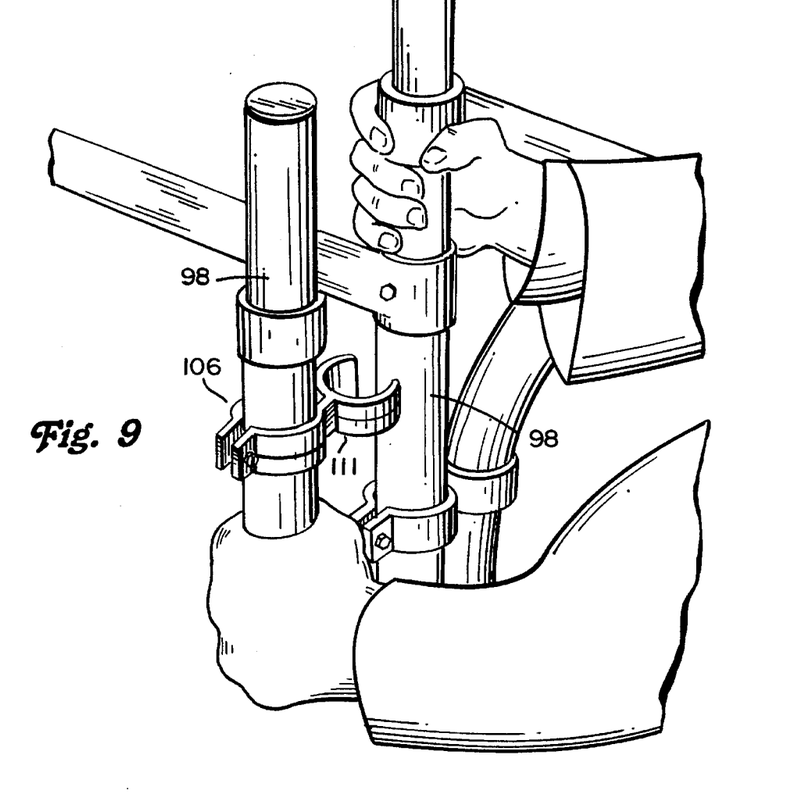
FIG. 9 is a fragmentary perspective view illustrating a quick connect/disconnect clip according to the present invention for securing the sections of the ladder to one another for form a backpack.
Figure 10:
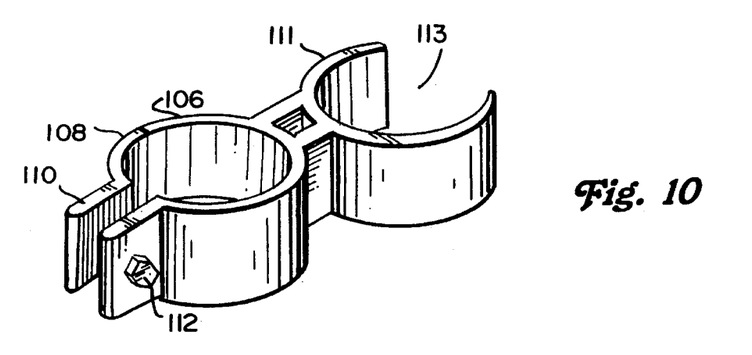
FIG. 10 is a perspective view of the clip.

The sections 92, 94 and 96 may be disassembled and reassembled to from a backpack, with the sections generally lying parallel to one another. To secure the sections to one another in a rattle-free backpack form, there is provided in accordance with the present invention two pairs of quick connect-disconnect clips adjacent opposite ends of each section. As best illustrated in FIGS. 9 and 10, the clips 106 include a split enclosure portion or ring 108 having flanges 110 projecting from opposite ends thereof. The split enclosure portion 108 is generally circular for engaging about the circular side rails of the ladder, although it will be appreciated that other cross-sectional shapes of the side rails and clips may be used. A resilient, generally circular portion 111 with an opening 113 between its distal ends for receiving a side rail projects laterally from the enclosure portion 108. Consequently, as illustrated in FIG. 6, enclosure portion 108 may be disposed about a side rail 98 and secured thereto by passing a bolt 112 through the flanges 110. The resilient enclosure portion 113 may thus be clipped onto an adjoining side rail 98 of another section by pressing the rail 98 into the enclosure 111. Because the clip 106 is formed of a high-strength plastic material, the ladder sections are maintained in generally parallel, spaced, and generally co-extensive relation relative to one another and are rattle-free during backpacking. As illustrated in FIG. 8, the clips 106 are provided in pairs adjacent each of the opposite ends of the ladder sections, with the exception of the upper section which does not require clips.

Figure 11:
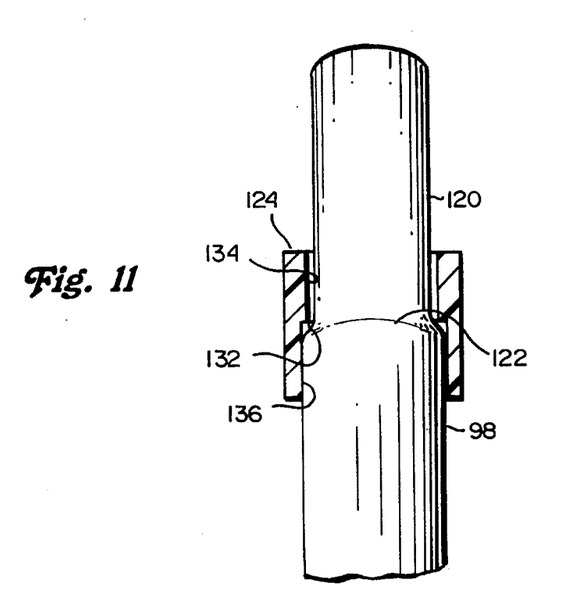
FIG 11 is a cross-sectional view illustrating an anti-lock bushing of the present invention disposed on a reduced diameter end of a side rail of a ladder section.

Referring now to FIG. 11, each side rail 98 of each section and at one end thereof is swaged down to form a reduced cross-section 120 relative to the larger cross-section of the remaining portion of the rail 98. There is a transition radius 122 between the swaged-down reduced cross-section 120 and the rail proper. To join the ladder sections to one another, as illustrated in FIG. 8, the lower end of the upper section is telescoped over the reduced cross-section upper end of the lower section. In accordance with the present invention, there is provided an anti-lock bushing 124 which precludes the rails of the upper and lower sections from binding and locking up against one another when the weight of the climber on the assembled ladder presses the sections together. To accomplish this, there is provided in accordance with the present invention an anti-lock bushing 124 comprised of a collar conforming to the cross-section of the side rails 98. More particularly, the collar is formed of a hard plastic material, has a central opening and a step or flange 132 intermediate the opposite ends of the bushing defining a reduced diameter upper end section 134 and a larger diameter cross-section 136 at its lower end. The diameters of the sections 134 and 136 correspond to the diameters of the swaged end 120 and the normal diameter of the side rail 98, respectively. Prior to assembling the sections of the ladder, the bushing 124 is disposed over the swaged end 120 of the side rail 98 such that the step or flange 132 engages the radiussed portion 122 with the enlarged diameter section 136 overlying the rail 98. The reduced diameter section of the bushing 134 overlies the reduced cross-section 120. When the sections are assembled, the lower ends of the side rails of the upper section telescope over the swaged ends 120 and butt endwise against the upper surfaces of the anti-lock bushers, spacing the rails of the upper section from the radiussed portions 122 of the lower section. In this manner, the rails of the upper and lower sections are prevented from binding and locking up relative to one another.

Figure 12:
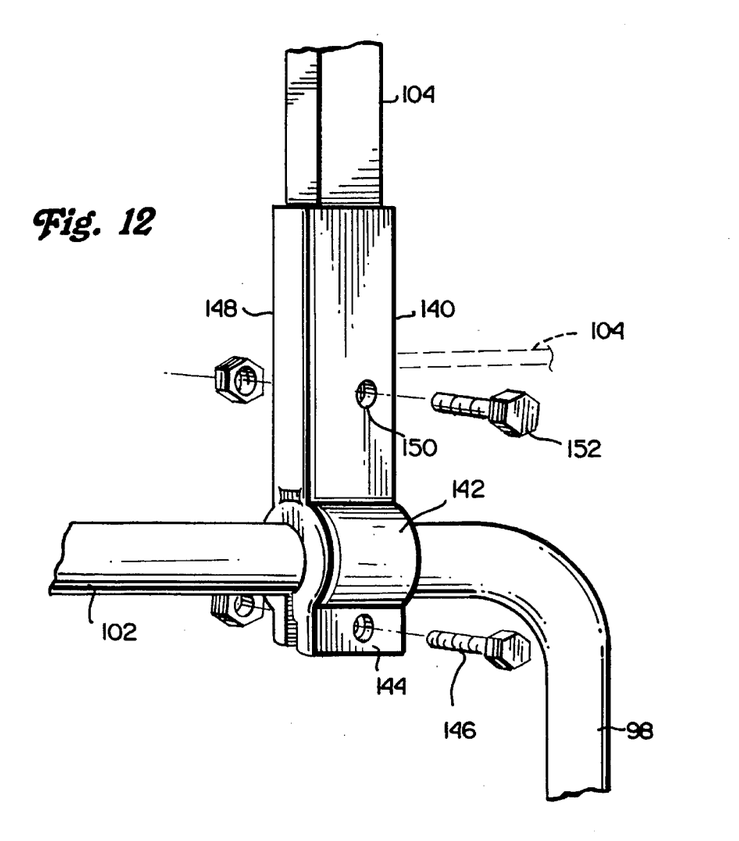
FIG. 12 is a fragmentary perspective view of a gun rest bracket for use with the ladder stand illustrated in FIG. 8.

Referring now to FIG. 12, there is illustrated a gun rest bracket 140 for use with the ladder stand illustrated in FIG. 8. The gun rest bracket 140 includes a split enclosure or ring 142 mounting flanges 144 at the ends of the legs of the rings. Thus, the split enclosure 142 may be secured to the generally horizontally projecting rail 102 of the upper ladder section by passing bolt 146 through the flanges 144. The bracket also includes an upstanding channel-shaped section 148, opposite sides of which have registering openings 150 for receiving a bolt 152. The lower square tubular ends of the gun rest 104 are received in the channels 148. A bolt 152 passes through registering openings in the lower end of each tubular end of the gun rest received in the channel. Consequently, the gun rest is pivotal about bolt 152 between an upright position, as illustrated in FIGS. 8 and 12, and a generally right angularly related position illustrated by the dashed lines in FIG. 12. It is important to be able to pivot the gun rest into the dashed line configuration for purposes of mounting the gun rest on and close to the upper section of the ladder when the ladder is disassembled and assembled to from the backpack. The interior of the channel 148 also includes a stop along one or both of the side walls for detenting the gun rest in the upstanding position illustrated in FIG. 9. The gun rest 140 is formed of a resilient plastic material. Additionally, the upper ends of the side walls of each channel-shaped gun bracket 140 rest taper inwardly in their natural condition such that the side walls may resiliently bear against the lower tubular end of the gun rest when in the upright position, assuring effective detenting thereof in that position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a tree stand having at least one of a climbing section and a platform section, said one section including a frame comprised of a pair of laterally spaced elongated side frame members, a cross-member at one end of the frame for abutment against a tree, and a pair of inclined supports projecting from a location intermediate the ends of the frame toward said one frame end, a generally V-shaped flat, substantially planar bar having interior edges within the V-shape of the bar and exterior edges opposite thereto, said V-shaped flat bar engaging about a tree on a side thereof opposite said frame, means for connecting the V-shaped bar to the inclined supports to enable the one end of the frame, the inclined supports and the V-shaped bar to encompass the tree, a strap for connecting the V-shaped bar and the tree to one another, said V-shaped flat bar having a flange projecting out of the plane of the bar at a location spaced outwardly of the inner edges of the bar and having at least one slot for receiving the strap whereby the strap may extend through the slots and encircle the tree to secure the one section to the tree with the strap spaced from the tree at its connection with the flange.

2. A V-shaped flat bar for the tree stand according to claim 1 wherein said flange projects upwardly from said flat V-shaped bar and is located adjacent all apex of the V-shaped bar along said outer edges thereof.

3. A V-shaped flat bar for the tree stand according to claim 1 wherein said V-shaped bar is formed of stamped aluminum having a thickness of about 3/16".

* * * * *